United States Patent [19]

Hardy

[11] Patent Number: 4,473,419

[45] Date of Patent: Sep. 25, 1984

[54] METHOD OF FORMING AND BONDING A PANEL REPAIR PATCH

[76] Inventor: Michael J. Hardy, 5524 W. Sioux Trail, Peoria, Ill. 61607

[21] Appl. No.: 544,214

[22] Filed: Oct. 21, 1983

[51] Int. Cl.³ ............................................. B32B 35/00
[52] U.S. Cl. .................................... 156/94; 29/402.09; 156/214; 156/247; 264/36; 428/40; 428/63
[58] Field of Search ................ 29/402.09; 156/59, 94, 156/212, 214, 233, 247; 264/36; 428/40, 63

[56] References Cited

U.S. PATENT DOCUMENTS 4,125,739 11/1978 Bow .................................. 428/40 X

Primary Examiner—Robert Dawson
Attorney, Agent, or Firm—James R. Bell

[57] ABSTRACT

A metal laminate is formed of a metallic member suitable to be repeatedly manually molded to conform to and retain the shape of an associated surface prior to being affixed thereto. An adhesive backing is on one side of the member and the backing is covered by a protective peelable coating.

5 Claims, 4 Drawing Figures

METHOD OF FORMING AND BONDING A PANEL REPAIR PATCH

BACKGROUND OF THE INVENTION

1. Field of the Invention

This invention relates generally to metal working and more particularly to repairing an article of mechanical manufacture such as by applying a deformable metal repair patch.

2. Description of the Prior Art

Applying a metal repair patch to a vehicle body is disclosed by Trapani in U.S. Pat. No. 3,850,718. The patch includes a relatively thick commercially available adhesive backing. The Trapani patch is disclosed as being a metal sufficiently heavy to resist bending or deformation.

In U.S. Pat. No. 3,470,048 Jones discloses a method of patching automotive bodies using a patch which is applied to the body then covered with a plastic resin coating. The coating is then sanded and the edges are feathered to the body surface. Although a heavy metal patch is preferred, the Jones patch can be thin enough to conform to a curved surface. However, it is limited where it is desired to patch over a fold or sharp bend in the vehicle body.

Beem discloses, in U.S. Pat. No. 4,147,575, a plastic patch used to repair a body surface. The patch is applied with contact cement. An edge sealant is added and the patch is then sanded to bevel the edges to the body. The plastic patch of Beem cannot be hand molded to retain the shape of the surface to be patched prior to being affixed.

The foregoing illustrates limitations of the known prior art. Thus, it is apparent that it would be advantageous to provide an alternative directed to overcoming one or more of the limitations as set forth above. Accordingly, a suitable alternative is provided including features more fully disclosed hereinafter.

SUMMARY OF THE INVENTION

In one aspect of the present invention, this is accomplished by providing a metal laminate including a metallic member which is of a construction sufficient to be repeatedly manually molded to conform to an associated surface prior to being affixed thereto. An adhesive backing is attached to one surface of the member and a protective peelable coating is attached to the adhesive.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
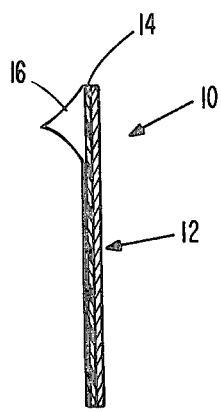
FIG. 1 illustrates a cross-sectional view of an embodiment of the patch of this invention.
Figure 2:
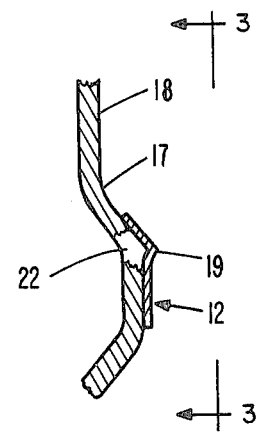
FIG. 2 illustrates a cross-sectional view of the patch conformed to a body surface.
Figure 3:
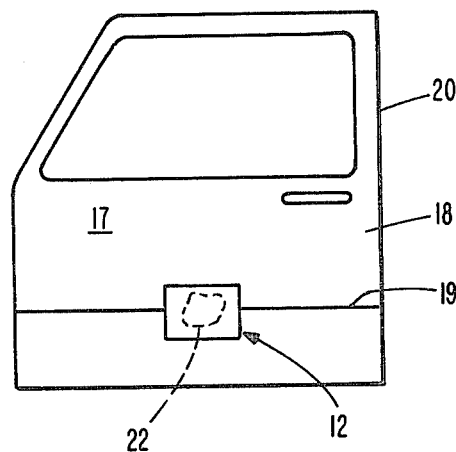
FIG. 3 is a view of an automotive door including a portion viewed from line 3—3 of FIG. 2.
Figure 4:
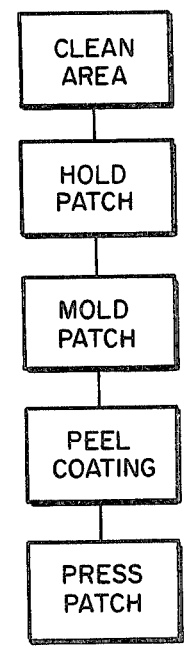
FIG. 4 is a graphical representation of steps of the method used to practice the invention.

A metal laminate is generally designated 10 in FIGS. 1, 2 and 3 and comprises a metal member or patch 12 having an adhesive 14 attached to one side thereof. A protective peelable coating 16 such as a waxed paper is attached to adhesive 14.

Metal patch 12 is a suitable aluminum alloy of a construction sufficient to be manually deformable so as to be repeatedly pressed and molded by hand to conform to and retain the shape of an associated surface, such as in the repair of a rust hole 22, or the like, in a surface 17 of panel 18 of an automobile body. Patch 12 can be held in abuttment with a repair area of panel 18, which may be an exemplary automotive door 20, to be repeatedly manually press-molded to conform to surface 17 of panel 18 including a sharp fold or bend 19. Thus patch 12 can be appropriately shaped prior to being affixed to surface 17. Patch 12 is preferably formed of aluminum having a thickness of from about 0.012 inches to about 0.025 inches. The preferred thickness is about 0.020 inches.

Adhesive 14 is commercially available pressure sensitive adhesive which is applied to patch 12 and then covered by peelable coating 16 and allowed to set. In this manner, once patch 12 is molded to the desired shape, coating 16 can be peeled from adhesive backing 14 and patch 12 can be pressed to adhere to a pre-cleaned repair area of surface 17 via adhesive 14. Patch 12 is useful for covering rust hole 22, a tear or other hole formed in panel 18. The combined thickness of patch 12 and adhesive 14 are relatively thin. Thus, patch 12 smoothly and closely adheres to surface 17 so that no edge sealant and/or bevelling are required. A large sheet of the aluminum alloy may have the adhesive 14 and coating 16 applied in advance then stored. In this manner, a patch 12 of a desired smaller size can be easily cut with scissors from the large sheet at a later time as desired.

The method of applying patch 12 includes pre-cleaning a repair area of the surface 17 to be repaired. Patch 12 is then held in abuttment with the surface 17 and is repeatedly manually press-molded to conform to surface 18 which may include a sharp bend 19. Patch 12 retains the press-molded shape and is thus shaped prior to being affixed to surface 17. Coating 16 is then peeled from adhesive 14 and patch 12 is manually pressed to adhere to surface 17.

The foregoing has described a metal patch which is of a construction sufficient to be repeatedly manually molded to conform to a surface to be patched prior to being affixed thereto. The patch is primarily for the repair of an automotive body surface but can also be used to repair household items and can be finished with ornamental and decorative items. Also, using the disclosures herein, a large patch can be adhered to a surface behind a sink or stove and be used as a splatter shield. Various surface finishes can be used for the patch such as, paint, chrome, brass, primer, and others. In fact, numerous needs for a finished laminate of manually moldable metal can be accomplished according to the teachings of this invention.

It is anticipated that aspects of the present invention, other than those specifically defined in the appended claims, can be obtained from the foregoing description and the drawings.

Having thus described the invention, what is claimed is:

1. A method of patching a body panel comprising the steps of:
   cleaning a repair area of a body to be patched;
   holding a metal patch in abuttment with the repair area;
   repeatedly manually molding the patch to conform to the body surface as required, the patch including a side having an adhesive backing covered by a protective peelable coating;
   peeling the coating from the adhesive; and
   pressing the adhesive side of the patch against the body for adhering the patch thereto.

2. The method of claim 1 wherein said metal patch is of a construction sufficient to be repeatedly manually molded to conform to and retain the shape of an associated body prior to being affixed thereto.

3. The method of claim 2 wherein said metal patch has a thickness of from about 0.012 inches to about 0.025 inches.

4. The method of claim 1 wherein said metal patch is of an aluminum alloy.

5. The method of claim 4 wherein said patch has a thickness of from about 0.012 inches to about 0.025 inches.

* * * * *